United States Patent Office 3,781,224  
Patented Dec. 25, 1973

3,781,224  
METHOD OF ACTIVATING A CATALYST  
Natale Ferlazzo, Milan, Giambattista Antonelli, Brugherio, and Giancarlo Aglietti, Milan, Italy, assignors to Società Italiana Resine S.p.A., Milan, Italy  
No Drawing. Filed Nov. 5, 1971, Ser. No. 196,201  
Claims priority, application Italy, Nov. 12, 1970, 31,630/70  
Int. Cl. B01j *11/06, 11/50*  
U.S. Cl. 252—447        11 Claims

ABSTRACT OF THE DISCLOSURE

Silver-based catalysts for the oxidation of ethylene are activated by heating in nitrogen then in nitrogen with an oxygen content progressively raised to 20%.

---

The present invention relates to silver-based catalysts used in the production of ethylene oxide by oxidation of ethylene at elevated temperature in the presence of oxygen or gases containing molecular oxygen.

In particular, the present invention relates to a process for activation of such catalysts.

It is already well-known that in the production of ethylene oxide by oxidation of ethylene at elevated temperature, in the presence of oxygen or gases containing molecular oxygen, silver-based catalysts are used.

Such catalysts essentially consist of a thin layer of silver possibly in combination with minor quantities of metal of the platinum, gold, palladium, barium, calcium type covering an inert support of granular form.

In industry, silver-based catalysts for the production of ethylene oxide are normally prepared by impregnation of the inert support by solutions or suspensions of thermally decomposable compounds of the catalytically active metals and subsequent thermal decomposition of such compounds on the support.

Decomposition is normally carried out in the presence of air at a temperature between 250 and 400° C. Such catalysts are however not completely satisfactory. Indeed, it is extremely difficult for the catalysts of the prior art, as applied to the production of ethylene oxide, to have constant characteristics in separate preparations. Particularly, their activity and mechanical properties vary substantially.

Now, in an industrial plant which operates continuously with large quantities of reagents, it is particularly important to maintain the most clearly defined and constant working conditions possible. Therefore, it is of particular interest for the above-described purposes to provide catalysts the characteristic features of which are as constant as possible.

It has now been found possible to obtain silver-based catalysts which have clearly defined and constant properties, which may be used in gaseous phase oxidation of ethylene to the corresponding oxide, by a simple and economically convenient process.

This process consists essentially in thermally treating, for definite periods, the products obtained after impregnation of an inert support with solutions or suspensions of decomposable compounds of silver, and possibly other catalytically active metals, and subsequent drying, initially in the presence of a gas consisting essentially of nitrogen and subsequently in the presence of gaseous mixtures of nitrogen and oxygen with a progressively increasing content of oxygen.

More precisely, the product arising from the drying stage, which is preferably carried out in the presence of a stream of air at a temperature increasing to a maximum value not exceeding 160° C., is rapidly and in a period not exceeding 1 hour, brought to a level of temperature comprised between 270 and 350° C. in the presence of nitrogen or a nitrogen-oxygen mixture with an oxygen content equal to or less than 0.5% by volume.

The best results are obtained by bringing the temperature to the range from 300 to 310° C. in the presence of pure nitrogen. It is essential for the purposes of the present invention to maintain the catalyst under the above stated conditions with a throughput of gaseous mixture between 0.1 and 30 litres per g. of catalyst for a period of time ranging from 1 to 10 hours.

Subsequently, oxygen is added to the nitrogen or to the mixtures of nitrogen and oxygen in contact with the catalyst until an oxygen content equal to approx. 20% by volume of the nitrogen/oxygen mixture finally obtained is achieved in a period not less than 3 hours and preferably between 6 and 20 hours, the temperature being maintained at 270 to 350° C. and preferably between 300 and 310° C.

In the preferred embodiment of the process of the present invention, air is used as the source of oxygen in the mixture.

For this purpose, the air is mixed with pure nitrogen so as to respect, in the activation reactor, the volumetric ratios specified above. This is particularly simple and advantageous because the nitrogen-oxygen mixture used in the final part of the activation will consist exclusively of air.

After cooling, the catalyst is ready to be used.

The catalyst thus obtained is characterised by high and constant activity and mechanical properties which render it particularly suitable for use over long periods of time in the industrial production of ethylene oxide.

This seems to be due to the fact that, in contrast to the processes used in the prior art, in this case the changes and deterioration due to the processes of rapid and uncontrolled decomposition do not take place.

In addition to the above-mentioned advantages, the present invention is characterised by the fact that the operations can be easily automated.

Another important advantage derives from the fact that the operations of activation may be carried out directly in the reactor in which the ethylene oxide is produced. In this way, the catalyst is directly activated in the reactor before the oxidation reaction, with substantial operative simplifications.

In a preferred embodiment of the present invention, a fine suspension of carbon and at least one metal from the group comprising: platinum, gold and palladium, is prepared in a solution of silver lactate in lactic acid.

This suspension is used to impregnate the inert and subdivided support at a temperature ranging from 60 to 115° C. The supports used may be alumina, silicon carbide, magnesium oxide and combinations of these materials, particularly in spheres ranging from 4 to 9 mm. in diameter.

The impregnated particles are then dried under a stream of air at a temperature rising to a maximum not exceeding 160° C., in periods ranging from 3 to 20 hours. The product obtained is then subjected to the above-described activation treatment.

The quantities of compounds used are such that the final catalysts contain a quantity of silver, calculated as a metal, of 7 to 30% by weight in respect of the support, while the quantities of platinum, gold, palladium, barium and calcium may vary from 0.01 to 1% by weight in respect of the metallic silver.

In another embodiment, the support is initially impregnated at a temperature of 15 to 40° C. with an aqueous suspension comprising silver oxide and at least one metallic oxide for metal chosen from the class comprising the metals platinum, palladium, gold, barium and calcium, and then dried as above.

The dried particles are then impregnated by an aqueous solution comprising one or more organic acids chosen from the group consisting of acetic acid, tartaric acid, lactic acid, citric acid, maleic acid and isomaleic acid and possibly silver salts and one or more of the said acids, drying then following at a temperature comprised between 60 and 160° C. at atmospheric pressure or at pressures below atmospheric.

Activation is then carried out according to the process of the present invention.

According to another form of embodiment, the support is first impregnated by one or preferably more inert organic liquids having a boiling point in the range from 150 to 330° C.

The particles obtained are subsequently impregnated by a solution comprising lactic acid and silver lactate, subjected to drying at a temperature comprised in the range from 60 to 160° C., and then to activation. All these systems of impregnation have been the subject of our previous applications for patent.

The catalysts activated according to the process which is the object of the present invention allow a production of at least 180 g. ethylene oxide per kg. of catalyst and per hour with a selectivity of converted ethylene of not less than 68%.

The invention will now be illustrated by the following examples which do not imply any limitation.

EXAMPLE 1

500 mg. of carbon containing 5% by weight of platinum were added to 15.7 g. lactic acid (titer 80%). Then 8.5 g. silver oxide were added and the temperature raised to approx. 90° C.

In this way, a solution of silver lactate in lactic acid was obtained, containing a fine suspension of carbon-platinum.

50 g. of tiny spheres of alumina of an average diameter of approx. 7.1 mm., macroporous, with a total pore volume equal to 44%, average pore diameter 100 microns, were placed in an evaporator rotating at a temperature of 90° C., to which the suspension described was added; this was then allowed to cool to room temperature.

In the test, alpha-alumina was used which had been activated by being heated to 1100° C. and having a surface area of less than 1 sq. m./g.

The impregnated spheres were brought to slow rotation at 90° C., 50 litres/hour of air being passed over them; the temperature was then gradually increased over 16 hours up to 120° C. The stream of air was then replaced by a stream of nitrogen, the throughput being still maintained at 50 litres/hour while the temperature was rapidly increased to 300° C.

Then, a small quantity of air was introduced so that the oxygen content of the mixture equalled 0.2% by volume and the catalyst was maintained under these conditions for 9 hours.

Then the nitrogen was totally replaced by air, the rate of addition of the air itself being regulated over a period equal to 7 hours so that the temperature still remained at 300° C. The catalyst was cooled an discharged ready for use.

31.3 g. of the catalyst prepared as above were introduced into a stainless steel tube 7.9 mm. diameter and measuring 61.5 cm. in height.

The tube was externally heated with oil to 269° C. 257 Nl./h. of a gaseous mixture were then fed into the tube, the composition of the mixture being as follows:

|  | Percent by volume |
|---|---|
| Ethylene | 9.28 |
| Nitrogen | 84.60 |
| Oxygen | 6.00 |
| Ethane | 0.12 |

285 g. of ethylene oxide were recovered per kg. of catalyst and per hour with a selectivity of converted ethylene equal to 70%.

Separately, another two preparations of the catalyst for ethylene oxide were carried out, using the same reagents in the identical quantity and under the same conditions as above. Each time, the catalyst produced was used in the preparation of ethylene oxide under identical conditions to those stated above.

In the two preparations, 203 and 216 g. ethylene oxide respectively were recovered per kg. of catalyst and per hour with a selectivity of 71 and 70% respectively for the ethylene converted.

EXAMPLE 2

A catalyst prepared to the impregnation stage as under Example 1, was activated, for comparison, by the procedures known in the literature.

For this purpose, the impregnated spheres were brought to slow rotation at 90° C., 50 litres of air per hour being passed over them, whereupon the temperaure was gradually increased to 120° C. over a period of 16 hours.

Then, still with a flow of 50 litres of air per hour the temperature was rapidly raised to 300° C. and the catalyst maintained at this temperature for 4 hours.

31.3 g. of catalyst prepared as above were then introduced into a stainless steel tube measuring 7.9 mm. in diameter and 61.5 cm. high.

The tube was heated externally with oil to 269° C. 257 Nl./h. of a gaseous mixture were then introduced into the tube, the mixture being of the following composition:

|  | Percent by volume |
|---|---|
| Ethylene | 9.28 |
| Nitrogen | 84.60 |
| Oxygen | 6.00 |
| Ethane | 0.12 |

176 g. ethylene oxide were recovered for every kg. of catalyst and for every hour with a selectivity of the converted ethylene equal to 70%.

We claim:

1. A process for the activation of silver-based catalysts for the oxidation of ethylene to ethylene oxide characterised by:
   (i) bringing an alumina support impregnated with a decomposable silver compound, carbon and platinum to 270° to 350° C. over a period of up to an hour in nitrogen free of or containing up to 0.5% by volume of oxygen
   (ii) maintaining the temperature for 1 to 10 hours while passing through the impregnated support 0.1 to 30 litres of the nitrogen per hour per gram thereof
   (iii) maintaining the temperature and gas flow rate while bringing the oxygen content of the gas stream up to approximately 20% by volume of the nitrogen/oxygen mixture over a period of at least 3 hours.

2. A process according to claim 1, characterised in that the raising of the oxygen content of the gas stream is carried out over a period of 6 to 20 hours.

3. A process according to claim 1, characterised in that the temperature is 300 to 310° C.

4. A process according to claim 1, characterised in that pure nitrogen is used in stages (i) and (ii).

5. A process according to claim 1, in which air is used to raise the oxygen content of the nitrogen.

6. A process according to claim 1, characterised by the use of an impregnated alumina support prepared by impregnation of the inert and sub-divided alumina support at a temperature comprised between 60 and 115° C. with an aqueous suspension comprising silver, such as silver lactate in lactic acid, carbon, and platinum, and by drying the thus impregnated particles in a stream of air at a temperature rising to a maximum not exceeding 160° C., in a period ranging from 3 to 20 hours.

7. A process according to claim 1, characterised by the use of an impregnated alumina support prepared by impregnation of the inert and sub-divided alumina support at a temperature of 15 to 40° C. by an aqueous suspension comprising silver oxide, carbon and platinum, by drying of the impregnated particles, by impregnating the dried particles with an aqueous solution comprising one or more organic acids selected from the group consisting of acetic acid, tartaric acid, lactic acid, citric acid, maleic acid and isomaleic acid and optionally silver salts of one or more of such acids, and finally by drying of the thus impregnated particles at a temperature between 60 and 160° C. at pressures at or below atmospheric pressure.

8. A process according to claim 1, characterised by the use of an impregnated alumina support prepared by initially impregnating the inert and sub-divided alumina support by one or preferably more inert organic liquids of boiling point between 150 and 330° C. and subsequently by a solution comprising lactic acid and silver lactate carbon and platinum and finally by drying the impregnated particles at a temperature between 60 and 160° C.

9. A process according to claim 1, characterised in that alumina is used as support, in spheres of a diameter between 4 and 9 mm.

10. Catalysts for the production of ethylene oxide by oxidation of ethylene at elevated temperature in the presence of oxygen or gases containing molecular oxygen, activated by the process according to claim 1, consisting essentially of silver in quantities of 7 to 30% by weight in respect of the support, platinum and about 100% by weight of carbon in respect of the platinum.

11. A process according to claim 2, characterised in that the temperature is 300 to 310° C.

References Cited
UNITED STATES PATENTS

| | | | |
|---|---|---|---|
| 2,040,782 | 5/1936 | Van Peski | 252—476 X |
| 2,477,435 | 7/1949 | Aries | 252—476 X |
| 3,420,784 | 1/1969 | Keith et al. | 252—476 X |

CARL F. DEES, Primary Examiner

U.S. Cl. X.R.

252—466 PT, 476